United States Patent
Steil et al.

(10) Patent No.: US 7,220,117 B2
(45) Date of Patent: May 22, 2007

(54) NOZZLE AND APPARATUS FOR INJECTION MOLDING

(75) Inventors: Fred Steil, Lake Orion, MI (US); Trevor Pruden, Windsor (CA)

(73) Assignee: D-M-E Company, Madison Heights, MI (US)

( * ) Notice: Subject to any disclaimer, the term of this patent is extended or adjusted under 35 U.S.C. 154(b) by 336 days.

(21) Appl. No.: 11/007,756

(22) Filed: Dec. 8, 2004

(65) Prior Publication Data
US 2006/0121155 A1    Jun. 8, 2006

(51) Int. Cl.
*B29C 45/20* (2006.01)
(52) U.S. Cl. .................. 425/564; 425/562; 425/566
(58) Field of Classification Search .......... 425/562, 425/564, 567, 574, 565, 566
See application file for complete search history.

(56) References Cited

U.S. PATENT DOCUMENTS

| | | | |
|---|---|---|---|
| 3,295,169 A | | 1/1967 | Moslo |
| 3,719,310 A | * | 3/1973 | Hunten ............... 222/497 |
| 3,934,626 A | * | 1/1976 | Hall .................. 141/117 |
| 3,941,540 A | | 3/1976 | Driscoll et al. |
| 4,073,469 A | * | 2/1978 | Kodric ................ 251/86 |
| 4,076,485 A | | 2/1978 | Sokolow |
| 4,082,226 A | | 4/1978 | Appleman et al. |
| 4,212,626 A | | 7/1980 | Gellert |
| 4,333,608 A | | 6/1982 | Hendry |
| 4,427,361 A | | 1/1984 | Saito |
| 4,678,427 A | * | 7/1987 | Fritzsche ............. 425/562 |
| 4,822,269 A | * | 4/1989 | Kamiyama et al. ...... 425/203 |
| 5,012,839 A | * | 5/1991 | Rogers et al. .......... 137/341 |
| 5,225,217 A | | 7/1993 | Wisen et al. |
| 5,229,145 A | | 7/1993 | Brown et al. |
| 5,380,188 A | | 1/1995 | Ullisperger |

(Continued)

FOREIGN PATENT DOCUMENTS

| | | |
|---|---|---|
| GB | 1540698 A | 2/1979 |
| JP | 60149425 A | 8/1985 |

OTHER PUBLICATIONS

International Search Report and Written Opinion of the Searching Authority in PCT/US2005/013656 (mailed Aug. 16, 2005).

*Primary Examiner*—Yogendra N. Gupta
*Assistant Examiner*—Emmanuel S. Luk
(74) *Attorney, Agent, or Firm*—John W. Gregg

(57) ABSTRACT

A nozzle for controlling flow of melt in a mold assembly comprises a valve pin guide interposed between a nozzle inlet and nozzle outlet, a valve pin movably supported thereby, and a contact arm engaging the valve pin and transverse to and passing through the valve pin guide. Biasing means acting on the contact arm hold the valve pin in a position preventing flow of melt. As the mold assembly closes, forces exerted on the contact arm overcome the biasing means and allow the valve pin to move to a position permitting flow of melt. Relief of pressure of retained melt is effected when force therefrom exerted on the valve pin exceeds an adjustable pre-load of the biasing means. The nozzle advantageously comprises an inlet bushing movably supported by the nozzle body enabling adjustment of the overall length of the nozzle to accommodate a range of spacing of elements of the mold assembly.

20 Claims, 3 Drawing Sheets

U.S. PATENT DOCUMENTS

| | | |
|---|---|---|
| 6,348,171 B1 | 2/2002 | Dewar et al. |
| 6,409,955 B1 | 6/2002 | Schmitt et al. |
| 6,575,731 B1 | 6/2003 | Olaru et al. |
| 6,733,274 B2 * | 5/2004 | Seta et al. .................. 425/589 |
| 2002/0140132 A1 * | 10/2002 | Seta et al. ............. 264/328.11 |
| 2004/0131722 A1 | 7/2004 | Dufner |

* cited by examiner

NOZZLE AND APPARATUS FOR INJECTION MOLDING

I. BACKGROUND OF THE INVENTION

1. Field of the Invention

This invention relates generally to injection molding. In particular, this invention relates to nozzles for controlling flow of melt through conduits between an injection unit and mold cavities.

2. Description of Related Art

Injection molding is a cyclic process wherein mold assemblies defining mold cavities are operable between "open" and "closed" conditions, the open condition permitting release of molded articles and the closed condition permitting filling of the cavities with material to be molded. Mold assemblies comprise mating mold components comprising a primary core component and primary cavity component, the primary core component and primary cavity component meeting along a so called "parting line" when the mold assembly is closed. The mating mold components define cavities defining the shape and size of articles to be molded. A mold assembly within the press unit of a molding machine is illustrated in FIG. 1a. Filling of cavities is effected by forcing flowable material, e.g. molten metal, rubber or thermoplastic (known as "melt"), from an injection unit through conduits to the mold cavities. Once filled, the mold assembly is held closed while the molten material solidifies and is opened to allow removal of molded articles when the material has sufficiently solidified to retain the molded form without unacceptable distortion when the material is unsupported. It is known in injection molding to provide valves for controlling flow of melt from the injection unit to the mold assembly.

It is known for each pair of mating mold components to define plural mold cavities. For such mold assemblies, it is known to provide conduits for conducting melt from the injection unit to plural nozzles, each nozzle controlling the flow of melt to one or more mold cavities. To prevent leakage of melt from the conduit on separation of the mating mold components, it is known to provide a nozzle valve for opening and closing the melt conducting passage within the nozzle. It is known to operate such valves with pneumatic or hydraulic actuators to control the opening and closing of the valves in accordance with a predetermined scheme for controlling flow of melt into the mold assembly for, for example balancing pressure among plural cavities or controlling the rate of mold filling. The complexity and cost of such nozzles makes them ill suited to applications where the valves need only be operated between a fully open condition while the mold assembly is closed and otherwise fully closed. It is also known to provide passively actuated valves with biasing means to hold the valves closed until force from admission of melt to the nozzle overcomes the biasing force and opens the valve. Such valves have the disadvantage that residual pressure in the controlled conduit after opening of a mold assembly may be sufficient to prevent full closure of the valve and hence permit leakage through the valve, known as "drooling". In light of the foregoing, there is a need for nozzle valves that are effectively fully opened and closed by passive means operated by the opening and closing of mold assemblies.

Improved productivity of injection molding is achieved by providing mold arrangements comprising plural mold assemblies having plural parting lines wherein the mating mold components are carried on intermediate movable platens interposed between a stationary platen and a primary movable platen defining a press or clamping unit of the injection molding machine. Such arrangements are known as "stack molds" or "dual molds" and FIG. 1b illustrates such a mold arrangement in the press unit of a molding machine. In such mold arrangements, melt is conveyed from the injection unit to the mold cavities through conduits that must accommodate cyclic separation of the mold components carried by the intermediate movable platens. It is known to provide conduits with elements for varying the effective conduit length to accommodate variations in distance arising from movement of the intermediate platens. Such constructions introduce complexities that significantly increase the cost of the required conduits for such mold arrangements. It is also known to provide an arrangement of valves at separations of conduits to control flow through the conduits, the valves being operated by pneumatic or hydraulic actuators. The use of such actuators increases the complexity and cost of valves for controlling flow of melt through the conduits. Hence there is a need for controlling the flow of melt through conduits for mold arrangements comprising plural mold assemblies that overcome the disadvantages of the known devices.

II. SUMMARY OF THE INVENTION

It is an object of the present invention to provide a nozzle for controlling flow of melt through conduits of injection molding equipment, the passage of melt therethrough being controlled by a valve comprising the nozzle and opened and closed by opening and closing of a mold assembly.

It is a further object of the present invention to provide a nozzle for controlling flow of melt through conduits of a mold assembly wherein passage of melt therethrough is controlled by a valve comprising the nozzle and opened and closed by opening and closing of a mold assembly and additionally opened by internal pressure in excess of a predetermined limit.

It is a still further object of the present invention to provide an apparatus for controlling flow of melt through a mold arrangement comprising plural mold assemblies, the apparatus comprising at least one conduit for conveying melt from an injection unit to at least one mold assembly, the conduit comprising mating segments abutted with closure of the mold assemblies and separated with opening of the mold assemblies, at least one of the mating segments comprising a nozzle comprising a valve for controlling passage of melt therethrough, and an inlet bushing movable relative to the nozzle for accommodating a range of spacing of components of the mold assemblies, and wherein the valve is actuated by opening and closing of the mold assemblies.

Further objects and advantages of the invention shall be made apparent from the accompanying drawings and the following description thereof.

In accordance with the aforesaid objects the present invention provides a nozzle for controlling flow of melt through conduits of a mold assembly, the nozzle comprising a nozzle body having a nozzle passage therethrough joining a nozzle inlet and a nozzle outlet, a valve pin guide interposed between the nozzle inlet and nozzle outlet and having a valve pin guide bore therein and at least one guide passage in communication with the portions of the nozzle passage separated by the valve pin guide, a valve pin movably supported within a bore of the valve pin guide, the valve pin movable between an open position permitting melt to flow through the nozzle and a closed position preventing melt from flowing through the nozzle, a contact arm transverse to and passing through an opening in the valve pin guide and engaging the end of the valve pin therein, opposed ends of the contact arm extending beyond the nozzle passage, and a biasing means, the biasing means applying a force to the contact arm in the direction of the closed position, the nozzle being mounted so that the contact arm is displaced to the valve pin open position by forces applied to the contact arm as a result of closure of the mold assembly. Advantageously the nozzle further comprises means for relieving internal pressure from retained melt in excess of a predetermined limit, the pressure relieving means comprising a reaction surface on the valve pin to apply forces from melt pressure to the valve pin in a direction to move the valve pin to an open position and a pre-load adjusting means for adjusting the force of the biasing means at which relief of internal pressure will occur. Further, the present invention provides an apparatus for controlling flow of melt through a mold arrangement comprising plural mold assemblies, the apparatus comprising at least one conduit for conveying melt from an injection unit to at least one mold assembly, the conduit comprising mating segments abutted with closure of the mold assemblies and separated with opening of the mold assemblies, at least one of the mating segments comprising a nozzle in accordance with the invention and comprising an inlet bushing for connection to a conduit segment and received within the nozzle body at the nozzle inlet, a nose portion of the inlet bushing being movably supported within the nozzle passage, means for adjusting a maximum overall length of the nozzle with inlet bushing by adjusting the extremity of relative location of the inlet bushing and the nozzle body, and, inlet bushing biasing means for biasing the inlet bushing toward the extremity of relative location of the inlet bushing and nozzle body.

III. BRIEF DESCRIPTION OF THE DRAWINGS

IV. DETAILED DESCRIPTION OF THE PREFERRED EMBODIMENT

The invention shall be illustrated with reference to a preferred embodiment which shall be described in detail. It is not the intention of applicant that the invention be limited to the preferred embodiment, but rather that the invention shall be defined by the appended claims and all equivalents thereof.

Figure 1A:
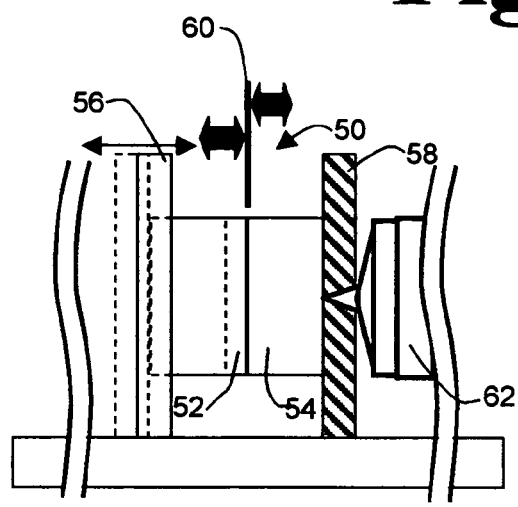
FIGS. 1a and 1b illustrate mold assemblies within press units of molding machines

Referring to FIG. 1a, a mold assembly 50 comprises a primary core component 52 and a primary cavity component 54. Primary core component 52 is supported by movable platen 56, and primary cavity component 54 is supported by stationary platen 58. Mold assembly 50 has parting line 60. Movable platen 56 and stationary platen 58 comprise a press unit of an injection molding machine. Movable platen 56 is moved to open and close mold assembly 50, an open position of movable paten 56 being shown in phantom (dashed line) in FIG. 1a. Melt is injected to mold assembly 50 from an injection unit 62, admitting melt through a passage in stationary platen 58 as illustrated by the cross-section thereof shown in FIG. 1a. Primary core component 52 and primary cavity component 54 advantageously define plural mold cavities (not shown). Distribution of melt to those cavities is advantageously effected by a configuration of conduits and nozzles (not shown in FIG. 1a) receiving melt at the passage through stationary platen 58 and conveying melt through the nozzles to the cavities. Advantageously, a nozzle in accordance with the invention may be applied to mold assembly 50 to be open with closing of mold assembly 50 and closed with opening of mold assembly 50.

Figure 1B:
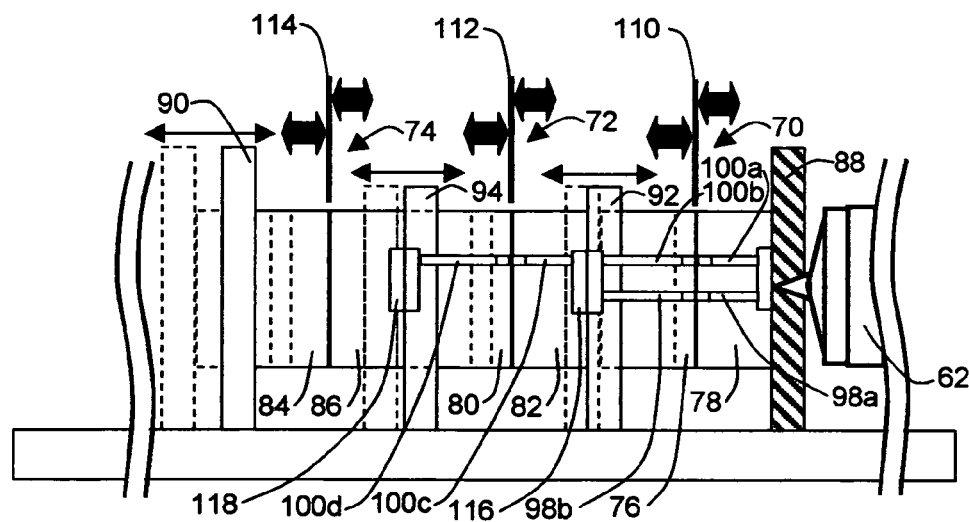

Referring to FIG. 1b, mold assemblies 70–74 have parting lines 110–114, respectively; mold assembly 70 comprises primary core component 76 and primary cavity component 78; mold assembly 72 comprises primary core component 80 and primary cavity component 82; and mold assembly 74 comprises primary core component 84 and primary cavity component 86. Movable platen 90 and stationary platen 88, together with intermediate movable platens 92 and 94 compose a press unit of an injection molding machine. Movable platen 90, movable intermediate platen 94, and movable intermediate platen 92 are moved to open and close mold assemblies 70–74, an open position of movable paten 90 and intermediate movable platens 92 and 94 is shown in phantom (dashed line) in FIG. 1b. Primary cavity component 78 is supported by stationary platen 88, primary core component 84 is supported by movable platen 90, primary cavity component 86 and primary core component 80 are supported by intermediate movable platen 94; and primary cavity component 82 and primary core component 76 are supported by intermediate movable platen 92. Melt is injected from injection unit 62 via a passage through or conduit around stationary platen 88 to mold assembly 70; via conduit pair 98a and 98b comprising conduit 100 through junction 116 to conduits comprising mold assembly 72; and via conduit pair 100a and 100b comprising conduit 100 to junction 116 and from junction 116 via conduit pair 100c and 100d comprising conduit 100 through junction 118 to conduits comprising mold assembly 74. Conduit pairs 98a and 98b, 100a and 100b, and 100c and 100d comprise so call "sprue bar" segments, the segments of each pair separating and mating with operation of the stack mold assembly. Although illustrated as meeting proximate the mold parting lines 110 and 112, respectively, the segments of each pair may meet anywhere within the length between the supports for the segments. Heaters are advantageously applied to conduits 100 and 98 as well as conduits comprising intermediate platens 92 and 94 to maintain a flowable state of melt contained therein throughout a molding cycle. Notwithstanding that molding material has solidified in the mold cavities, melt remains fluid within such conduits requiring control to prevent leakage therefrom on opening of the mold assemblies. Advantageously, nozzles in accordance with the invention (not shown in FIG. 1b) can be applied to control the flow of melt from injection unit 62 to mold assemblies 70–74 as will be more fully described herein.

Figure 2:
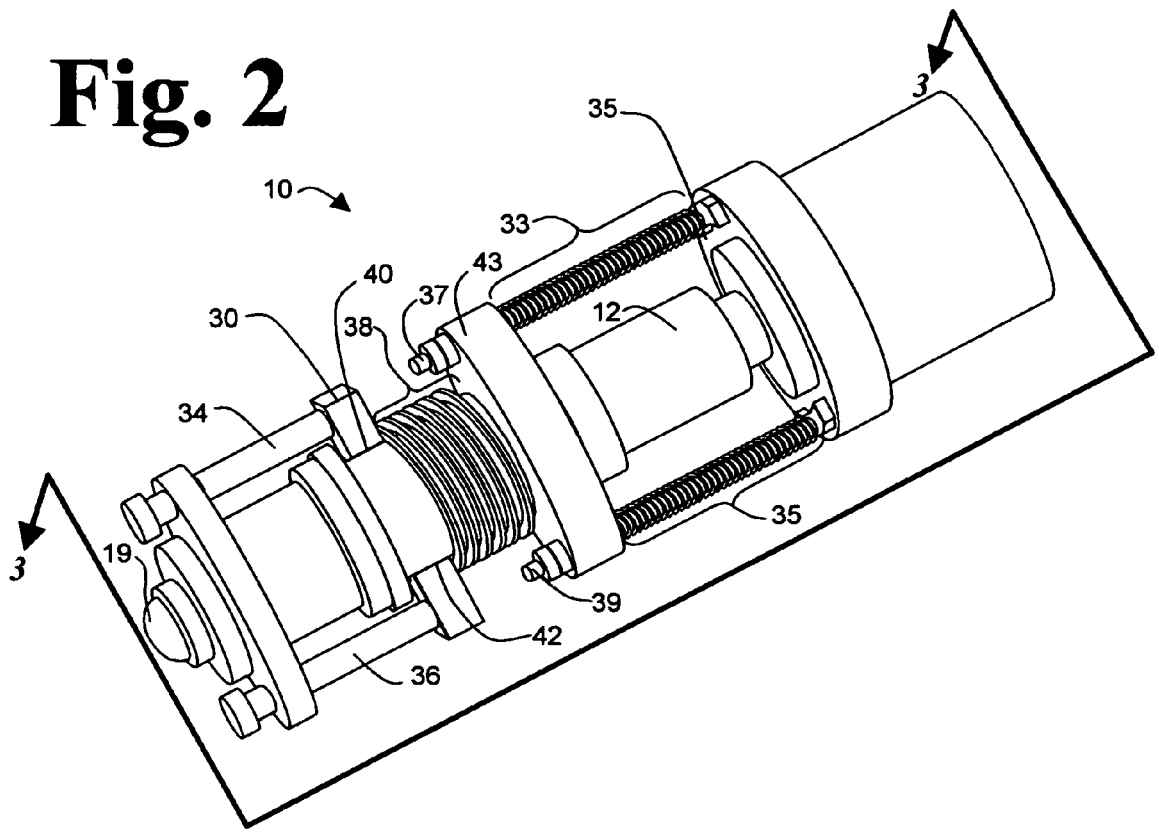
FIG. 2 is a three dimensional view of a nozzle in accordance with the invention.
Figure 3:
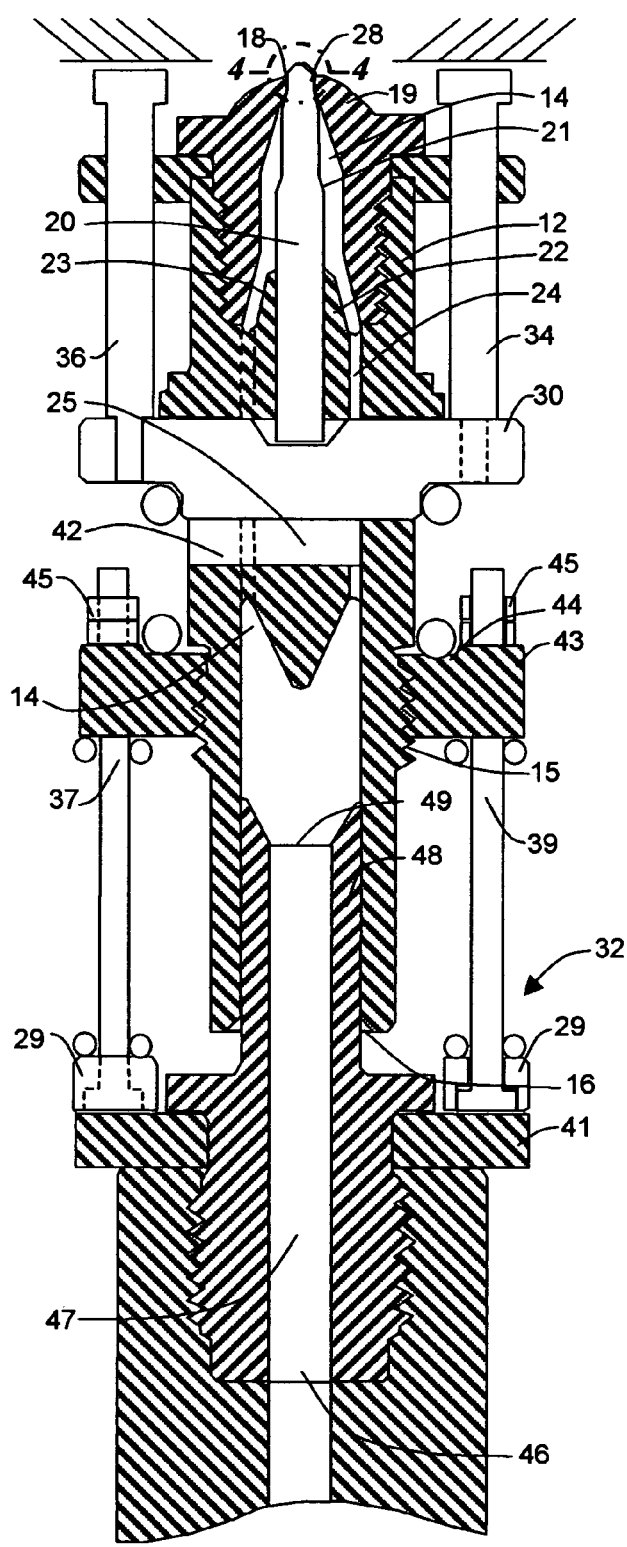
FIG. 3 is a partial sectional view of the nozzle taken along line 3—3 of FIG. 2.

Referring to FIGS. 2 and 3, a nozzle 10 comprises nozzle body 12 having a nozzle passage 14 therethrough joining nozzle inlet 16 and nozzle outlet 18 comprising nozzle tip 19. A valve pin guide 22 comprising nozzle body 12 is interposed between nozzle inlet 16 and nozzle outlet 18. At least one passage through valve pin guide, such as guide passage 24, is in communication with the portions of nozzle passage 14 separated by valve pin guide 22. Guide passages 24 enable flow of melt between nozzle inlet 16 and nozzle outlet 18. A valve pin 20 is movably supported in bore 23 of valve pin guide 22. Bore 23 is open at the end of valve pin guide 22 proximate nozzle outlet 18. Valve pin 20 comprises valve end 28 sized to form a seal at nozzle outlet 18 and at least one diametrical step, such as step 21, providing a reaction surface for forces from pressurized melt within nozzle passage 14. The end of valve pin 20 opposite valve end 28 abuts or is attached to contact arm 30. Contact arm 30 is transverse to valve pin guide 22 and passes through opening 25 therein. Opposed ends of contact arm 30 project beyond nozzle passage 14 through openings 40 and 42 in nozzle body 12. None of openings 40, 42 or 25 intersect guide passages 24. Hence, openings 40, 42 and 25 do not connect with melt conveying passages within nozzle 10.

Continuing with reference to FIGS. 2 and 3, contact arm 30 comprises contact pins 34 and 36 attached to contact arm 30 by, for example, threaded engagement therewith as by threaded ends of each of contact pins 34 and 36 engaging a threaded bore in contact arm 30. The opposite ends of contact pins 34 and 36 are exposed for contact with surfaces illustrated schematically in FIG. 3. Spring 38 is located on the periphery of nozzle body 12. One end of spring 38 abuts contact arm 30 and the other end of spring 38 abuts shoulder 44 on nozzle body 12. Spring 38 provides a biasing force to hold valve pin 20 in the closed position shown in FIG. 3. Nozzle body 12 is mounted so that on closure of a mold assembly, the free ends of contact pins 34 and 36 will contact a surface (shown schematically in FIG. 3) as a result of relative motion between nozzle body 12 and the surface. Thereafter, continued relative motion of nozzle body 12 and the surface to reduce the distance therebetween will overcome the force of spring 38 to effect motion of contact pins 34 and 36 and contact arm 30 relative to nozzle body 12 away from nozzle tip 19 to a valve pin open position. With valve pin 20 attached to contact arm 30, this relative movement of contact arm 30 separates valve end 28 from nozzle outlet 18. Alternatively, were valve pin 20 not attached to contact arm 30, relative movement of contact arm 30 permits separation of valve end 28 from nozzle outlet 18 when the force acting on reaction surfaces of valve pin 20 from melt pressure within nozzle passage 14 is sufficient to drive valve pin 20 away from tip 19. With the mold assembly fully closed, the distance between nozzle body 12 and the surface will be at a minimum and valve pin 20 will be located within nozzle passage 14 at an open position (not shown). The open position of valve pin 20 enables flow of melt through nozzle 10, flowing through guide passages 24 between nozzle inlet 16 and nozzle outlet 18. On opening of the mold assembly, the distance between nozzle body 12 and the surface increases and contact pins 34 and 36 are restored to the position shown in FIG. 3 by the force of spring 38 acting on contact arm 30. Hence, the spring functions as a biasing means to hold nozzle 10 closed, i.e. to hold valve pin 20 in a closed position whenever a force is not applied to contact arm 30 to overcome the spring force.

Melt retained in nozzle 10 is maintained in a suitable flowable condition by transfer of heat to the melt from nozzle body 12. Heat may be supplied from a mold assembly component to which nozzle 10 is mounted or from supplemental heaters (not shown) applied to the periphery of nozzle body 12 or installed internally therein. To relieve pressure associated with heating of retained melt, nozzle 10 advantageously comprises means to move valve pin 20 to an open position in the event internal pressure from retained melt exceeds a predetermined limit. As shown, valve pin 20 comprises at least one step 21 intermediate valve end 28 and contact arm 30 providing a reaction surface on which forces from melt pressure are applied to valve pin 20 in a direction to move valve pin 20 toward its open position. Pre-load of spring 38 is adjusted in accordance with the force at which valve pin 20 is to be driven to its open position for pressure relief. Adjustment of pre-load of spring 38 is effected by adjusting ring 43. An internal thread of adjusting ring 43 engages external thread 15 on the exterior of nozzle body 12 permitting setting of relative location of adjusting ring 43 along the length of external thread 15 by rotation of adjusting ring 43. With adjusting ring 43 located to compress spring 38, spring 38 is effective to lock adjusting ring 43 in position on external thread 15 without additional locking elements. Were the magnitude of pre-load to be insufficient to lock adjusting ring 43 in position, locking means, such as a set screw (not shown) would advantageously be added to adjusting ring 43 to provide adequate force to clamp the internal thread against external thread 15.

Figure 5:
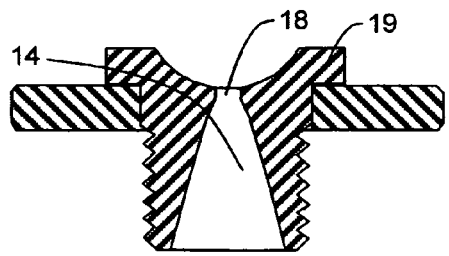
FIG. 5 is a partial sectional view of an alternative nozzle tip.
Figure 4A:
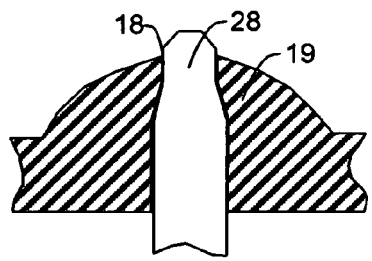
FIGS. 4a and 4b are enlarged sectional views of the portion of the nozzle tip enclosed by circle 4—4 of FIG. 3.
Figure 4B:
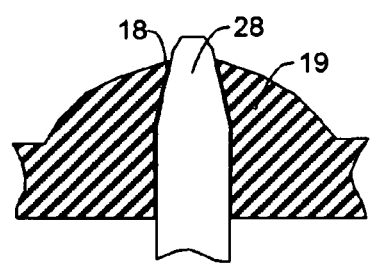

Referring to FIGS. 3, 4*a*, 4*b* and 5 alternative configurations of the valve end 28 and nozzle outlet 18 and nozzle tip 19 are shown. FIG. 3 illustrates nozzle tip 19 with a convex mating surface projecting from nozzle body 12. FIG. 5 illustrates nozzle tip 19 with a concave mating surface recessed inwardly. A stepped cylindrical form valve end is illustrated in FIG. 4*a*. A tapered form valve end is illustrated in FIG. 4*b*. In each of FIGS. 4*a* and 4*b*, nozzle outlet 18 comprising nozzle tip 19 conforms to the form of valve end 28.

Nozzle 10 further advantageously comprises length adjusting elements for accommodating a range of spacing between components of a mold assembly. While length adjustment may be desirable for any mold assembly, it is particularly advantageous as applied to mold arrangements comprising plural mold assemblies as illustrated in FIG. 1*b*. In such mold arrangements, spacing establishing the length of segments of sprue bar pairs 98*a* and 98*b*, 100*a* and 100*b*, and 100*c* and 100*d* is dependent in part on the overall dimension known as "shut height" of mold components mating on the parting lines as measured parallel to the direction of travel of movable platens. Providing nozzles of adjustable lengths facilitates use of sprue-bar segments of fixed length for mold assemblies having a range of shut-heights. Nozzles in accordance with the invention are advantageously applied at interfaces of mating conduit segments to control the flow of melt through the segments. In such applications, the nozzles of the mating segments are arranged in opposed fashion, one having a convex nozzle tip and one having a concave nozzle tip, the nozzle tips being seated when the mold assembly is closed. Adjustment of nozzle length permits use of sprue bar segments of fixed length for mold assemblies defining a range of required segment lengths.

Referring again to FIGS. 2 and 3, an inlet bushing, such as inlet bushing 32, is movably received in nozzle body 12 from nozzle inlet 16. Inlet bushing 32 comprises bushing body 48 through which bushing passage 47 joins bushing inlet 46 and bushing outlet 49. Bushing outlet 49 comprises a nose portion of bushing body 48 received within nozzle passage 14; bushing inlet 46 comprises a stub portion of bushing body 45, the stub portion being joined to a conduit of a mold assembly by, for example, a threaded connection. Adjustment of a maximum overall length of nozzle 10 with inlet bushing 32 is achieved using means for setting the outward extremity of relative location of inlet bushing 32 and nozzle body 12. As shown in FIG. 3, inlet bushing 32 is located at the outward extreme of its range of travel relative to nozzle body 12 defining the maximum overall length of nozzle 10. On mold closure, inlet bushing 32 can move relative to nozzle body 12 towards nozzle tip 19 accommodating spacing between mating sprue bar segments that is less than the overall length of nozzle 10. The adjusting means comprise adjusting pins 37 and 39 together with stop nuts 45. Head ends of adjusting pins 37 and 39 are retained on pin retaining collar 41 by pin retainers 29. The shafts of adjusting pins 37 and 39 pass through adjusting ring 43. The effective length of adjusting pins 37 and 39 spans the distance between a reference surface of nozzle body 12, i.e., adjusting ring 43 and a reference surface of inlet bushing 41, i.e. pin retaining collar 41. Stop nuts 45 are threaded on to the ends of adjusting pins 37 and 39 projecting beyond adjusting ring 43. The extremity of longitudinal extension of inlet bushing 32 relative to nozzle body 12 is established by adjusting the effective length of adjusting pins 37 and 39, establishing a maximum overall length of nozzle 10 with inlet bushing 32. Springs 33 and 35 surround adjusting pins 37 and 39, respectively, and serve as inlet bushing biasing means to resist relative movement of inlet bushing 32 and nozzle body 12 tending to reduce the separation between adjusting ring 43 and pin retaining collar 41. While two adjusting pins are shown, additional adjusting pins and inlet bushing biasing springs may be provided. Advantageously, the overall length of nozzle 10 with inlet bushing 32 is adjusted to be greater than the spacing between mating mold components, such as mating conduit segments, when the mold assembly is closed. Upon closure of the mold assembly forces applied to nozzle 10 sufficient to overcome the forces exerted by the inlet bushing biasing means compress springs 33 and 35 and move nozzle body 12 and inlet bushing 32 relative to each other to reduce the overall length equal to that spacing.

Continuing with reference to FIGS. 2 and 3, relative longitudinal location of nozzle body 12 and inlet bushing 32 are adjusted so that with the mold assembly closed, springs 33 and 35 are compressed. With closure of the mold assembly valve tip 28 is separated from outlet 18 allowing melt to pass therethrough. Considering an arrangement of two nozzles with their tips seated, melt is conveyed from nozzle inlet 16 through nozzle outlet 18 of a first (forward) nozzle and from nozzle outlet 18 through nozzle inlet 16 of the second (reverse) nozzle. On mold closure, any difference in melt pressure of residual melt contained within the mated segments will be equalized by flow of melt across the interfaces of seated nozzles. Under the condition that nozzle passage 14 of each nozzle is full of melt, melt pressure applies a force in the direction of nozzle outlet 18 against the inside of nozzle tip 19 and applies a force in the direction of nozzle inlet 16 on the nose portion of inlet bushing 32. Forces acting in the direction of nozzle outlet 18 are additive with the forces exerted by springs 33 and 35 due to the compression thereof, and forces in the direction of nozzle inlet 16 oppose the force of springs 33 and 35. Under the condition that injection does not begin until mold closure is complete, the force of springs 33 and 35 is sufficient to overcome net forces from melt pressure prior to equalization. During filling of mold cavities, melt pressure within the nozzles is determined primarily by the pressure of injection. To prevent movement of nozzle body 12 relative to inlet bushing 32 toward nozzle inlet 16 during mold filling, areas of surfaces determining the effective forces from melt pressure are chosen to insure the forces additive with the force from springs 33 and 35 is greater than the opposing forces. In particular, the cross sectional area of nozzle passage 14 at nozzle tip 19, net of the cross sectional area of valve pin 20, and the cross sectional area of the nose portion of inlet bushing 32 net of the cross sectional area of bushing passage 47 are chosen to achieve a net force from melt pressure that is either additive with the force of springs 33 and 35 or nil. Hence, nozzles of adjustable length in accordance with the invention advantageously maintain a desired nozzle length using pressure of the conveyed melt to overcome forces tending to compress the nozzles during mold filling.

While the nozzle of FIGS. 2 and 3 is shown with contact pins 34 and 36 mounted directly to contact arm 30, linkages may be interposed between contact arm 30 and contact pins 34 and 36 without departing from the spirit or scope of the invention. Such arrangements allow placement of the contact pins 33 and 34 apart from contact arm 30 to accommodate constructions of components in which the nozzles are mounted. Further, while the valve pin biasing means is illustrated as spring 38 (shown as a helical spring in FIG. 2), other biasing means may be employed without departing from the spirit or scope of the invention. Still further, although not shown in the preferred embodiments, replaceable sealing members may be applied to valve pin 20 without departing from the spirit and scope of the invention. Such sealing members being selected to provide a seal with nozzle outlet 18 that accommodates differences in rates of thermal expansion of the valve pin and nozzle body and reduces wear on the nozzle body. Additionally, replaceable sealing members may be provided on the periphery of the nozzle body as well as surrounding the inlet and outlet ends thereof without departing from the spirit and scope of the invention. Such sealing members being selected to accommodate differences of thermal expansion of the nozzle body and the component in which it is mounted. Likewise, heating devices, such as heater bands and so called cartridge heaters as are known, may be applied externally or internally to the nozzle to maintain melt retained within the nozzle in a flowable condition. Other additions and substitutions of elements known to those skilled in the art may be applied to the nozzles and apparatus herein shown and described without departing form the spirit and scope of the invention as claimed.

What is claimed is:

1. A nozzle for controlling flow of melt through conduits of a mold assembly, the nozzle comprising a nozzle body having a nozzle passage therethrough joining a nozzle inlet and a nozzle outlet, a valve pin guide interposed between the nozzle inlet and nozzle outlet and having a valve pin guide bore therein and at least one guide passage in communication with the portions of the nozzle passage separated by the valve pin guide and melt is conveyed solely through the guide passages between the nozzle inlet and the nozzle outlet, a valve pin movably supported within a bore of the valve pin guide, the valve pin movable between an open position permitting melt to flow through the nozzle and a closed position preventing melt from flowing through the nozzle, a contact arm transverse to and passing through an opening in the valve pin guide and engaging the end of the valve pin therein, opposed ends of the contact arm extending beyond the nozzle passage, and a biasing means, the biasing means applying a force to the contact arm in the direction of the closed position, the nozzle being mounted so that the contact arm is displaced to the valve pin open position by forces applied to the contact arm as a result of closure of the mold assembly.

2. The nozzle according to claim 1 further comprising means for relieving internal pressure from retained melt in excess of a predetermined limit, the pressure relieving means comprising a reaction surface on the valve pin to apply forces from melt pressure to the valve pin in a direction to move the valve pin to an open position and a pre-load adjusting means for adjusting the force of the biasing means at which relief of internal pressure will occur.

3. The nozzle according to claim 2 further comprising heaters for maintaining melt within the nozzle in a flowable condition.

4. The nozzle according to claim 2 further comprising an inlet bushing for connection to a conduit of a mold assembly and received within the nozzle body at the nozzle inlet, a nose portion of the inlet bushing being movably supported within the nozzle passage, means for adjusting a maximum overall length of the nozzle with inlet bushing by adjusting an extremity of relative location of the inlet bushing and the nozzle body, and inlet bushing biasing means for biasing the inlet bushing toward the extremity of relative location of the inlet bushing and nozzle body, whereby the overall length of the nozzle with inlet bushing is reduced to a spacing between components of a closed mold assembly when applied forces are sufficient to overcome the inlet bushing biasing means.

5. The nozzle according to claim 4 wherein the means for adjusting the maximum overall length of the nozzle with inlet bushing further comprises adjusting pins having effective lengths spanning the distance between a reference surface of the nozzle body and a reference surface of the inlet bushing and stop nuts for adjusting the effective length of the adjusting pins.

6. The nozzle according to claim 5 wherein the pre-load adjusting means comprises a reference surface of the nozzle body and the adjusting pins are retained by a pin retaining collar comprising a reference surface of the inlet bushing.

7. The nozzle according to claim 4 wherein areas of surfaces acted on by melt pressure during mold filling are effective to produce forces additive with the forces exerted by the inlet bushing biasing means sufficient to overcome forces opposing the inlet bushing biasing means whereby relative movement of the inlet bushing and nozzle body to reduce the overall length of the nozzle with inlet bushing during mold filling is prevented.

8. The nozzle according to claim 1 further comprising an inlet bushing for connection to a conduit of a mold assembly and received within the nozzle body at the nozzle inlet, a nose portion of the inlet bushing being movably supported within the nozzle passage, means for adjusting a maximum overall length of the nozzle with inlet bushing by adjusting an extremity of relative location of the inlet bushing and the nozzle body, and inlet bushing biasing means for biasing the inlet bushing toward the extremity of relative location of the inlet bushing and nozzle body, whereby the overall length of the nozzle with inlet bushing is reduced to a spacing between components of a closed mold assembly when applied forces are sufficient to overcome the inlet bushing biasing means.

9. The nozzle according to claim 8 wherein the means for adjusting the maximum overall length of the nozzle with inlet bushing further comprises adjusting pins having effective lengths spanning the distance between a reference surface of the nozzle body and a reference surface of the inlet bushing and stop nuts for adjusting the effective length of the adjusting pins.

10. The nozzle according to claim 8 wherein areas of surfaces acted on by melt pressure during mold filling are effective to produce forces additive with the forces exerted by the inlet bushing biasing means sufficient to overcome forces opposing the inlet bushing biasing means whereby relative movement of the inlet bushing and nozzle body to reduce the overall length of the nozzle with inlet bushing during mold filling is prevented.

11. The nozzle according to claim 1 further comprising a nozzle tip, the nozzle tip comprising the nozzle outlet.

12. The nozzle according to claim 11 wherein the valve pin comprises a valve end for sealing with the nozzle outlet.

13. The nozzle according to claim 12 wherein the valve end has a stepped cylindrical form.

14. The nozzle according to claim 12 wherein the valve end has a tapered form.

15. An apparatus for controlling flow of melt through a mold arrangement comprising plural mold assemblies, the apparatus comprising at least one conduit for conveying melt from an injection unit to at least one mold assembly, the conduit comprising mating segments abutted with closure of the mold assemblies and separated with opening of the mold assemblies, at least one of the mating segments comprising a nozzle comprising: (i) a nozzle body having a nozzle passage therethrough joining a nozzle inlet and a nozzle outlet; (ii) a valve pin guide interposed between the nozzle inlet and nozzle outlet and having a valve pin guide bore therein and at least one guide passage in communication with the portions of the nozzle passage separated by the valve pin guide; (iii) a valve pin movably supported within a bore of the valve pin guide, the valve pin movable between an open position permitting melt to flow through the nozzle and a closed position preventing melt from flowing through the nozzle; (iv) a contact arm transverse to and passing through an opening in the valve pin guide and engaging the end of the valve pin therein, opposed ends of the contact arm extending beyond the nozzle passage; (v) a biasing means, the biasing means applying a force to the contact arm in the direction of the closed position, the nozzle being mounted so that contact arm is displaced to the valve pin open position by forces applied to the contact arm as a result of closure of the mold assembly; (vi) an inlet bushing for connection to a conduit segment and received within the nozzle body at the nozzle inlet, a nose portion of the inlet bushing being movably supported within the nozzle passage, (vii) means for adjusting a maximum overall length of the nozzle with inlet bushing by adjusting the extremity of relative location of the inlet bushing and the nozzle body, and, (viii) inlet bushing biasing means for biasing the inlet bushing toward the extremity of relative location of the inlet bushing and nozzle body.

16. The apparatus of claim 15 wherein the means for adjusting the maximum overall length of the nozzle with inlet bushing further comprises adjusting pins having effective lengths spanning the distance between a reference surface of the nozzle body and a reference surface of the inlet bushing and stop nuts for adjusting the effective length of the adjusting pins.

17. The apparatus of claim 15 wherein areas of surfaces acted on by melt pressure during mold filling are effective to produce forces additive with the forces exerted by the inlet bushing biasing means sufficient to overcome forces opposing the inlet bushing biasing means whereby relative movement of the inlet bushing and nozzle body to reduce the overall length of the nozzle with inlet bushing during mold filling is prevented.

18. The apparatus of claim 15 wherein the nozzle further comprises means for relieving internal pressure from retained melt in excess of a predetermined limit, the pressure relieving means comprising a reaction surface on the valve pin to apply forces from melt pressure to the valve pin in a direction to move the valve pin to an open position and a pre-load adjusting means for adjusting the force of the biasing means at which relief of internal pressure will occur.

19. The apparatus of claim 15 wherein the nozzle further comprises a nozzle tip, the nozzle tip comprising the nozzle outlet and the valve pin comprises a valve end forming a seal with the nozzle outlet.

20. The apparatus of claim 19 wherein the valve end is of stepped cylindrical form.

* * * * *